Figure 1:
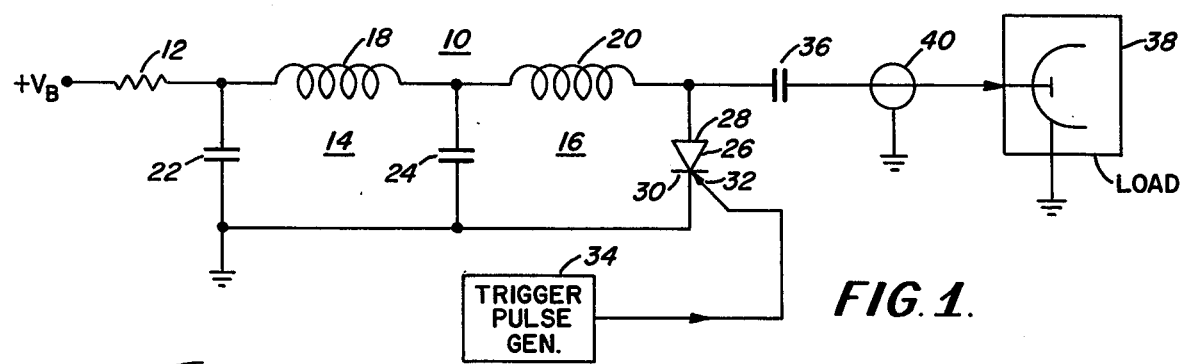

United States Patent
Osterwalder

[11] 3,881,120
[45] Apr. 29, 1975

[54] PULSE GENERATING CIRCUIT

[75] Inventor: Johann M. Osterwalder, San Diego, Calif.

[73] Assignee: General Dynamics Corporation, St. Louis, Mo.

[22] Filed: Dec. 5, 1973

[21] Appl. No.: 421,950

[52] U.S. Cl. ............. 307/260; 307/252 J; 307/284; 307/305; 328/65
[51] Int. Cl. ............................................. H03k 5/00
[58] Field of Search ........ 307/252 J, 252 M, 252 N, 307/260, 264, 268, 284, 305; 328/65, 67, 223

[56] References Cited
UNITED STATES PATENTS

| | | | |
|---|---|---|---|
| 3,015,739 | 1/1962 | Manteuffel | 328/65 |
| 3,139,588 | 6/1964 | Clark et al. | 328/223 |
| 3,296,551 | 1/1967 | Staples | 328/65 |
| 3,383,523 | 5/1968 | Hurlimann | 328/65 |
| 3,496,476 | 2/1970 | Farrell | 328/67 |
| 3,544,818 | 12/1970 | Harris | 307/305 |
| 3,573,508 | 4/1971 | Harris | 307/284 |
| 3,577,017 | 5/1971 | Duke | 307/284 |
| 3,681,656 | 8/1972 | Mitchell | 315/223 |
| 3,737,679 | 6/1973 | Cooper | 328/65 |

*Primary Examiner*—Stanley D. Miller, Jr.
*Attorney, Agent, or Firm*—Martin LuKacher

[57] ABSTRACT

A short pulse generating circuit suitable for use as a radar pulse transmitter is disclosed. Direct current energy is applied through a charging resistor to a pulse-forming network having at least two sections of series inductances and shunt capacitances. A silicon controlled rectifier, (SCR) is connected across the pulse-forming network output. Each time the SCR is triggered, the pulse-forming network produces two cycles of forward current followed by reverse current through the SCR which results in the generation of a high energy, extremely short duration pulse which is extracted from the anode of the SCR, exclusive of the other current cycles occurring therein, as by a small coupling capacitor. The capacitor is connected to a radar antenna and excites the antenna to radiate short high energy microwave pulses.

14 Claims, 2 Drawing Figures

PULSE GENERATING CIRCUIT

The present invention relates to pulse generating circuits and particularly to pulse generating circuits using semiconductor devices, such as silicon controlled rectifiers (SCR's).

The invention is especially suitable for use as a radar pulse transmitter for directly exciting an antenna to transmit short pulses. In such application, the invention provides a light, portable radar transmitter. The invention, however, is adapted for use wherever high energy, short duration pulses are required, as for modulating transmitter devices, including klystrons, and magnetrons as well as tube-type semiconductor type, or other types of high frequency pulse generating or transmitting apparatus.

Various types of pulse generating circuits, including silicon controlled rectifiers have heretofore been proposed, and the following U.S. Pat. Nos. are representative thereof: 2,919,414; 3,015,739; 3,267,299; 3,296,551; 3,513,328; 3,544,818; 3,573,508; 3,577,017; and 3,681,656. While such circuits are capable of producing short pulses, it is desirable to provide even shorter pulses, say, having rise time of 10 nanoseconds or less and durations of 20 nanoseconds or less. The previous attempts in shortening the duration and increasing the rise time of the pulses have, so far as is known, all been directed to reducing the time during which forward conduction takes place through the SCR or other triggerable semiconductor device which is utilized therein. It has been discovered, in accordance with this invention, that a pulse of high energy and extremely short duration is obtainable not from the initial forward conduction current through the SCR, as in the above-mentioned and referenced known circuits, but from conduction through the SCR which has been found to be produced after a plurality of cycles of forward conduction followed by reverse conduction.

Although the theoretical basis for the production of this high power short duration pulse is not fully understood, the existence of a plurality of cycles of forward and reverse conduction which necessarily precede the generation thereof is observable by actual measurement, as on an oscilloscope.

Without implying or otherwise inferring that the invention is limited to any theoretical basis or understanding of the physics which is involved, in the generation of the pulse, the following explanation is offered: The high power pulse is due to some charge storage effect in the SCR. This effect terminates abruptly when forward conduction is followed by reverse conduction, with the resultant production of the high energy and narrow pulse. The effect itself may be related to an acoustic wave travelling through the device junction from its anode to cathode. This wave may be launched by a piezoelectric effect generated during a short reverse current recovery interval.

Accordingly, it is an object of the present invention to provide an improved pulse generating circuit.

It is another object of the present invention to provide an improved modulator circuit for producing modulating pulses suitable for use in radar and other high frequency energy transmitting systems.

It is a still further object of the present invention to provide an improved pulse generating circuit using SCR's or other semiconductor devices which are triggerable into conduction.

It is a still further object of the present invention to provide an improved video pulse transmitter capable of providing video frequency pulses which may be used to directly excite high radio frequency pulse generators.

It is a still further object of the present invention to provide an improved pulse transmitter which is useful in an electromagnetic wave intrusion detection system.

Briefly described, a pulse generating circuit provided by the invention is adapted to produce a high energy pulse of extremely short duration for actuating or otherwise exciting a load, such as an antenna, to radiate a high frequency pulse signal. The principal active component in the circuit is a semiconductor device, such as an SCR, having anode, control and cathode electrode. The device is triggered into conduction. When triggered, a plurality of cycles of forward current conduction followed by reverse current conduction through the device is enabled, as by means of a multisection pulse forming network through which high voltage direct current is applied to the device. After the plurality of cycles occurs, the high energy short duration pulse is coupled to the load, as by means of a highpass filter, which may be afforded by a coupling capacitor of small value of capacitance.

Figure 2:
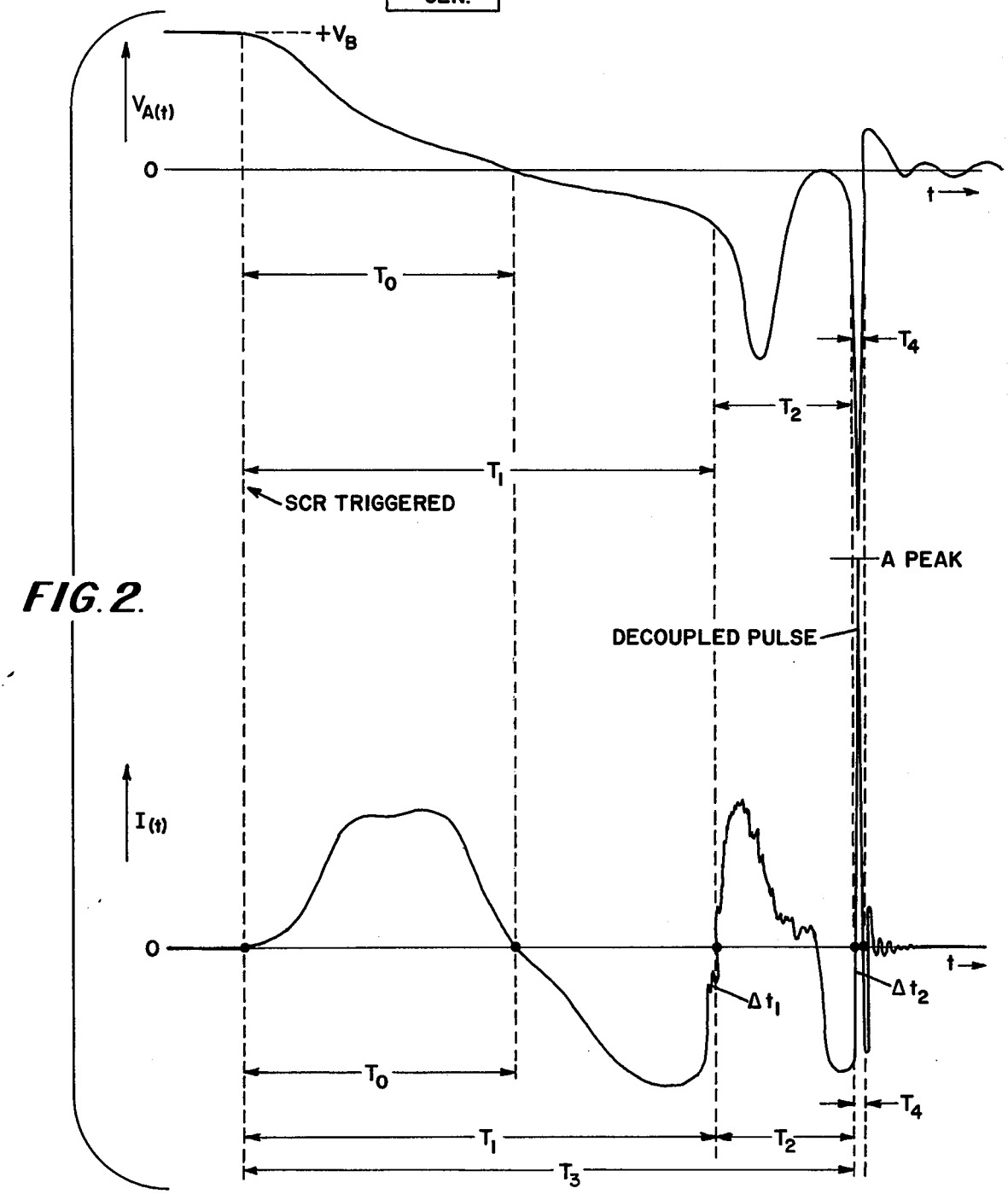

The foregoing and other objects and advantages of the present invention, as well as additional features thereof, will become more readily apparent from a reading of the following description when taken in connection with the accompanying drawings in which:

FIG. 1 is a schematic diagram of a video pulse transmitter embodying the invention; and FIG. 2 shows a pair of wave forms of the voltage across and current through the SCR device used in the transmitter illustrated in FIG. 1.

Referring to FIG. 1, the transmitter illustrated therein, which is especially suitable for use in a video pulse intrusion detector radar system, contains means for applying a high direct current voltage to the transmitter, the connection being indicated at $+V_B$. The source of this voltage may be a DC to DC converter which is included in the radar system, the high voltage output terminal of which is connected at $+V_B$. The converter would be returned as by being connected to ground.

A pulse-forming network 10 receives the direct current energy from the source connected at $+V_B$ through a charging resistor 12. The pulse-forming network 10 includes a plurality of sections 14 and 16, each having a series inductor 18 and 20, and a shunt capacitor 22 and 24. A semiconductor device in the form of a silicon controlled rectifier (SCR) 26 having an anode 28, a cathode 30, and control electrode 32, is connected across the output of the pulse-forming network 10. Direct current voltage is therefore applied across the SCR by way of the series inductors 18 and 20 and the resistor 12.

The control electrode 32 of the SCR 26 is connected to a trigger pulse generator 34. The trigger pulse generator provides trigger pulses to the SCR control or gate electrode to induce SCR conduction at a desired repetition frequency. The anode 28 of the SCR 26 is connected by means of a filter in the form of a small value capacitor 36 to a load 38, as by way of a coaxial cable 40.

The load 38 may be a radar antenna which receives the output pulse, coupled thereto by way of a capacitor 36. This pulse, being an extremely short rapid-rise-time pulse, excites the antenna to radiate the radar signal.

Each of the sections 14 and 16 of the pulse-forming network 10 is a resonant circuit tuned to a different resonant frequency which is equal to the reciprocal of $2\pi$ multiplied by the square root of the value of inductance of the inductor, multiplied by the value of capacitance of the capacitor contained therein (viz., $1/(2\pi \sqrt{LC})$. The coupling capacitor 36 provides a filter which passes only signals which are of higher frequency than the highest frequency to which either of the sections 14 and 16 is tuned. This will insure that only the high power short pulse is decoupled from the circuit and applied to the load.

The operation of the circuit is shown in FIG. 2. Once the SCR is triggered, the pulse-forming network 10 discharges and produces a large current pulse during the interval of time $T_0$. This is the current pulse which is conventionally utilized in heretofore known and available pulse generating circuits. The time $T_0$ is determined mainly by the characteristics of the SCR and is limited to the sum of turn on and turn off times of the employed device. There follows a reverse current cycle during the period $T_1$ ($T_1$ approximately $= 2.T_0$), which is terminated abruptly; the termination occurring during a short reverse current recovery interval $\Delta t_1$. It is believed that this abrupt cutoff of current is due to depletion of the stored charge in the SCR which may itself be related to an acoustic wave launched by the piezoelectric effect during the recovery interval $\Delta t_1$.

There then follows, due to the action of the second section 16 of the pulse-forming network, another cycle of forward current followed by reverse current during the period $T_2$. Again, reverse conduction is terminated abruptly during recovery interval $\Delta t_2$. The period $T_2$ is determined by the frequency to which the second section 16 is tuned in accordance with the following relationship:

$$T_2 = 1/F_2 = 2\pi \sqrt{L_{20} C_{24}} \quad (1)$$

where $F_2$ is the frequency to which the second section 16 is tuned, $L_{20}$ is the inductance of the inductor 20, and $C_{24}$ is the capacitance of the capacitor 24.

The desired event happens after a period $T_3$. The period $T_3$ is related to the frequency to which the first section 14 of the pulse-forming network 10 is tuned. Thus, $T_3$ is approximately equal to:

$$T_3 = 1/F_3 = 2\pi \sqrt{L_{18} C_{22}} \quad (2)$$

where $F_3$ is the frequency to which the first section 14 is tuned, $L_{18}$ is the inductance of inductor 18, and $C_{22}$ is the capacitance of capacitor 22.

After the recovery interval $\Delta t_2$ a huge voltage and current spike is generated of duration $T_4$ which has been measured to be ten times narrower than the first conduction period $T_0$. The duration $T_4$ is determined by the SCR characteristics and the output filter provided by the capacitor 36. It is this high energy, very short pulse which is coupled by the capacitor 36 to the load.

By way of explanation and without limitation, the following component values have been found by experimental tests to be suitable and capable of producing an output pulse having a pulse peak voltage of 825 volts and power of 12.8 kilowatts, with a rise time of less than 8 nanoseconds and a duration $T_4$ of about 18 nanoseconds:

| | |
|---|---|
| Resistor 12 | 12.5 kilo-ohms |
| Capacitor 22 | 43,000 pf |
| Capacitor 24 | 9,400 pf |
| Inductor 18 | 51 turns, No. 14 gauge wound on a cylindrical air coil form 0.315" outside diameter and 1.5" long |
| Inductor 20 | 10 turns, No. 14 gauge wound on a cylindrical air coil form of 0.315" outside diameter and 1" long |
| Capacitor 36 | 200 pf |
| SCR 28 | Motorola Type MCR-159-120 |

The trigger pulse generator 34 may suitably produce trigger pulses at a frequency of 250 Hz.

From the foregoing description it will be apparent that there has been provided an improved pulse generating circuit especially suitable for use in an intrusion detection system as a radar pulse transmitter. While exemplary embodiments of the circuit and transmitter system, together with suitable values of the circuit elements and components has been set forth above, it will be appreciated that the embodiment as described and the components mentioned are given solely for the purposes of illustrating the invention. Variations and modifications therein within the scope of the invention will undoubtedly suggest themselves to those skilled in the art. Accordingly, the foregoing description and specification should be taken merely as illustrative and not in any limiting sense.

What is claimed is:

1. A pulse generating circuit adapted to produce a high energy pulse of extremely short duration for actuating a load, such as an antenna, to radiate a high frequency pulse signal, said circuit comprising
    a semiconductor device having anode, control and cathode electrodes,
    means coupled to said control electrode for triggering said device into conduction,
    means coupled to said anode and cathode for producing a plurality of cycles of forward current conduction followed by reverse current conduction through said device, and
    means operative after said plurality of cycles occurs for coupling to said load, pulses which result from conduction in said device.

2. The invention as set forth in claim 1, wherein said means coupled to said anode and cathode is a pulse-forming network across which a source of high direct current voltage is connected.

3. The invention as set forth in claim 2, wherein said pulse-forming network contains a plurality of sections, each of said sections including circuits tuned to different resonant frequencies.

4. The invention as set forth in claim 3 wherein said device is a silicon controlled rectifier.

5. The invention as set forth in claim 4 wherein said anode and cathode of said silicon controlled rectifier is connected across said source in parallel with said pulse-forming network.

6. The invention as set forth in claim 3 wherein said means operative after said plurality of cycles occurs for coupling said pulse to said load includes filter means for passing signals of frequency higher than the highest one of said resonant frequencies.

7. The invention as set forth in claim 6 wherein said filter means is a capacitor connected between said anode and said load.

8. A pulse generating circuit for generating high power pulses of extremely short duration, said circuit comprising a silicon controlled rectifier, a pulse forming network connected to said silicon controlled rectifier, means for applying direct current voltage to said pulse-forming network and across said rectifier, means for triggering said rectifier into conduction, said pulse-forming network having a plurality of sections, each defining a different resonant frequency, and filter means coupled to said rectifier having a passband for frequencies higher than the highest said resonant frequency for coupling said pulses out of said circuit.

9. The invention as set forth in claim 8 wherein each of said sections of said network includes a capacitor and an inductor, said sections being connected in tandem and the values of capacitance and inductance of the capacitor and inductor in each of said sections defining the resonant frequency thereof.

10. The invention as set forth in claim 9 wherein said inductors are connected in series to said rectifier, and said voltage applying means is operative to apply said voltage across said rectifier through said inductors.

11. The invention as set forth in claim 10 including a charging resistor connected to said network, said applying means connecting said voltage to the inductor of the first of said sections through said resistor.

12. The invention as set forth in claim 10 wherein said triggering means comprises a trigger pulse generator connected to the control electrode of said rectifier.

13. The invention as set forth in claim 8 wherein said filter means is a capacitor.

14. The invention as set forth in claim 10 including a source of voltage having an amplitude approximately equal to the high peak non-conductive state voltage for which said rectifier is rated, said applying means being connected to said source.

* * * * *